United States Patent [19]
Kern et al.

[11] Patent Number: 5,051,590

[45] Date of Patent: Sep. 24, 1991

[54] FIBER OPTIC FLAME DETECTION AND TEMPERATURE MEASUREMENT SYSTEM HAVING ONE OR MORE IN-LINE TEMPERATURE DEPENDENT OPTICAL FILTERS

[75] Inventors: Mark T. Kern, Goleta; Kenneth A. Shamordola, Santa Barbara; Gregory L. Tangonan, Oxnard; John M. Wetzork, Goleta, all of Calif.

[73] Assignee: Santa Barbara Research Center, Goleta, Calif.

[21] Appl. No.: 447,494

[22] Filed: Dec. 6, 1989

[51] Int. Cl.[5] .................................... G01J 1/00

[52] U.S. Cl. ............................ 250/339; 250/227.14; 250/554; 374/161; 340/578

[58] Field of Search .............. 250/339, 227.14, 227.11, 250/227.16, 554, 227.23, 340; 340/577, 578, 584; 374/121, 131, 159, 161

[56] References Cited

U.S. PATENT DOCUMENTS

| | | | |
|---|---|---|---|
| 2,901,740 | 8/1959 | Cutsogeorge | 340/233 |
| 3,406,389 | 10/1968 | Nailen | 340/411 |
| 3,540,041 | 11/1970 | Payne | 340/409 |
| 3,546,689 | 12/1970 | Lindberg | 340/227 |
| 3,730,259 | 5/1973 | Wixson et al. | 165/5 |
| 3,880,324 | 4/1975 | Showalter et al. | 166/251 |
| 3,977,900 | 8/1976 | Luehrs | 136/83 |
| 4,138,655 | 2/1979 | Nakano et al. | 338/30 |
| 4,316,048 | 2/1982 | Woodall | 136/253 |
| 4,355,910 | 10/1982 | Quick et al. | 374/162 |
| 4,400,680 | 8/1983 | Heline, Jr. | 337/415 |
| 4,496,930 | 1/1985 | Krecisz et al. | 338/26 |
| 4,576,273 | 3/1986 | Milnes | 194/209 |
| 4,616,137 | 10/1986 | Goff et al. | 250/554 |
| 4,623,788 | 11/1986 | Kern et al. | 250/227 |
| 4,639,598 | 1/1987 | Kern et al. | 250/339 |
| 4,647,776 | 3/1987 | Kern et al. | 250/339 |
| 4,650,003 | 3/1987 | Euson | 169/60 |
| 4,655,390 | 5/1987 | Kern et al. | 340/587 |
| 4,655,607 | 4/1987 | Kern et al. | 374/4 |
| 4,679,156 | 7/1987 | Kern et al. | 364/551 |
| 4,691,196 | 9/1987 | Kern et al. | 340/578 |
| 4,701,624 | 10/1987 | Kern et al. | 250/554 |
| 4,769,775 | 9/1988 | Kern et al. | 364/551.01 |
| 4,785,292 | 11/1988 | Kern et al. | 340/578 |

OTHER PUBLICATIONS

Glenn, W. H., "Fiber Optic Tempetature Sensors", *Optical Fiber Sensors, Proceedings of the NATO Advanced Study Institute,* May, 1986, pp. 185–199.

"Fluorescent Decay Thermometer with Biological Applications", by R. R. Sholes et al., Rev. Sci., Instrum., vol. 41, No. 7, 9/80.

"Infrared Fluorescence Decay-Time Temperature Sensor", by K. T. V. Frattan et al.

(List continued on next page.)

*Primary Examiner*—Carolyn E. Fields
*Assistant Examiner*—James E. Beyer
*Attorney, Agent, or Firm*—W. C. Schubert; W. K. Denson-Low

[57] ABSTRACT

A fiber optic fire detection and temperature measurement system 10 includes a fiber optic cable 12 having a lens 14 at a distal to direct radiation from a fire 16 into the cable 12 and to a radiation detector 18 disposed at a proximal end of the cable 12. Detector 18 is coupled to a fire sensor 20. The detector 18 is sensitive to three wavelength bands including a short wavelength band of approximately 0.8 to 1.1 microns and a long-wavelength band of approximately 1.8 to 2.1 microns. A controller 22, analyzes the fire sensor 20 output signals which correspond to the two spectral bands to determine if a fire is present. The fiber optic conductor of cable 12 includes an optical filter 32 having a temperature dependent radiation transmission characteristic. Radiation from a fire passes via cable 12 to the detector 18. A dual wavelength pulse of radiation from a source 28 passes through the filter 32 where a reference wavelength, corresponding to one of the fire sensor spectral bands, passes through unimpeded while the other wavelength within a third spectral band is absorbed as a function of temperture. The detector includes third element 18*c* for detecting the third spectral band and includes circuitry 54 for determining the temperature of the coupler 30.

20 Claims, 2 Drawing Sheets

OTHER PUBLICATIONS

"A Laser-Pumped Temperature Sensor Using the Fluorescent Decay Time of Alexandrite", by A. T. Augousti et al., Jrnl. of Lightwave Technology, vol. LT-5, No. 6, Jun. 1987.

"Temperature Sensing by Thermally-Induced Absorption in a Neodymium Doped Optical Fiber", by M. Farries et al., SPIE vol. 798, Fiber Optic Sensors II (1987).

"Fiber Optic Temperature Sensors"by W. H. Glenn, United Technologies Research Center.

"Fiber Sensor Devices and Applications", by A. D. Kersey published for the Conference on Optical Fiber Communication, 1989.

FIBER OPTIC FLAME DETECTION AND TEMPERATURE MEASUREMENT SYSTEM HAVING ONE OR MORE IN-LINE TEMPERATURE DEPENDENT OPTICAL FILTERS

CROSS REFERENCE TO RELATED PATENT APPLICATION

This patent application is related to U.S. patent application Ser. No. 07/322,866, filed Mar. 14, 1989, entitled "Fiber Optic Flame and Overheat Sensing System With Self Test" by Mark T. Kern et al.

FIELD OF THE INVENTION

This invention relates generally to fire detection systems and, in particular, to a fiber optic fire detection system that employs as a temperature sensing element one or more in-line optical devices having a temperature dependent radiation transmission characteristic.

BACKGROUND OF THE INVENTION

One conventional fire and overheat sensor is known as a "thermal wire". This system senses a fire or overheat condition by thermal conduction from ambient to the center of a 1/16 inch diameter stainless steel tube. The sensing element may be a hydride which generates a gas as the temperature increases, the generated gas being sensed by a pressure switch. Alternatively the sensing element may be a salt or glass or a thermistor element which melts or changes resistance as temperature increases thus causing a change in an electrical resistivity vs. temperature characteristic of the sensing element.

Another conventional fire and overheat sensor employs a far-infrared optical detector to detect radiometric heat in combination with a two spectrum, far-near infrared fire detector.

However, for many high ambient temperature applications, such as jet aircraft engine nacelles, this latter type of system may not be useable in that the system typically has a maximum ambient temperature limitation of approximately 400° F. This maximum ambient temperature limitation is due in large part to the maximum temperature limits of the sensor electronics.

The thermal wire type of system, which typically has a higher ambient temperature limitation, is, suitable for use in an engine nacelle. However, this type of system has a relatively slow response time. As reported by Delaney, "Fire Detection System Performance in USAF Aircraft", *Tecnical Report AFAPL-TR*-72-49, August 1972 this type of system furthermore may not detect as many as 40% of confirmed fires while exhibiting up to a 60% false alarm rate.

In U.S. Pat. Nos. 4,701,624, 4,691,196, 4,665,390 and 4,639,598, all of which are assigned to the assignee of this invention, there are described fire sensor systems which have overcome the problems inherent in the aforementioned thermal wire type of system. These systems accurately and rapidly detect the occurrence of a fire while also eliminating false alarms. A combination of these techniques has been disclosed in U.S. patent application Ser. No. 07/322,866 using an optical fiber transmission medium employing wavelengths less than 2.5 microns. However, in that these systems employ wavelengths of less than 2.5 microns it is difficult for them to be simultaneously employed for detecting overheat conditions in the 200° C. in a radiometric fashion as described in U.S. Pat. No. 4,647,776, which is assigned to the assignee of this patent application.

It is thus an object of the invention to provide both a flame and heat sensing system that employs wavelengths of less than approximately 2.5 microns for flame detection while simultaneously detecting an overheat condition.

It is a further object of the invention to provide a flame and heat sensing system that employs wavelengths of less than 2.5 microns for flame detection while simultaneously detecting an overheat condition such that an actual flame condition is not required to generate an alarm condition.

It is a further object of the invention to provide a fiber optic flame detection system with a temperature measurement capability by employing a temperature dependent radiation transmission characteristic of a material that comprises an in-line optical element, the material being provided with optical radiation at a first and a second wavelength and the transmission response of the material at the two wavelengths being detected to determine the temperature.

It is also an object of the invention to provide signal processing circuitry such that a fire sensing function and an overheat sensing function do not interfere with one another even though these two functions may share the same fiber, detectors and circuitry.

SUMMARY OF THE INVENTION

The foregoing problems are overcome and other advantages are realized by a fiber optic fire and overheat sensor system that includes a fiber optic cable having a lens at a distal end to direct radiation from a fire into the cable and to a radiation detector disposed at a proximal end of the cable. The detector is coupled to a fire sensor. The detector is sensitive to two wavelength bands including, by example, a short wavelength band of approximately 0.8 to approximately 1.1 microns and a long-wavelength band of approximately 1.8 to approximately 2.1 microns. A controller, such as a microprocessor, analyzes the fire sensor output signals which correspond to the two spectral bands to determine if a fire is present. In accordance with one embodiment of the invention the system is provided with a temperature measurement capability by the inclusion of one or more optical devices selected to have a temperature dependent radiation transmission property. As an example, a plurality of in-line optical couplers are placed in series with the fiber optic cable. Each in-line optical coupler includes an optical filter. The optical filter is configured via a temperature dependent index of refraction to exhibit predetermined radiation transmission characteristics. Radiation from a source, such as a laser diode, is launched into the fiber optic cable. The fiber optic cable both transmits the source radiation to the distal end and also returns the fire signal from the distal end to the detector. In a preferred embodiment of the invention the source comprises a two-wavelength LED operated in either a pulsed or a CW mode. One wavelength (Lambda 2) is within a region where the in-line optical filter is always substantially transparent regardless of temperature. The other wavelength (Lambda 1) is associated with a third spectral band wherein the in-line optical filter transmission properties vary with temperature. As a result, a ratio of the Lambda 1 and Lambda 2 signal magnitudes obtained at the detector is indicative of the temperature of the environment along the length of the fiber cable.

By example, Lambda 2 may be a wavelength within the lower spectral band, such as 0.8 microns, so that the source pulse can be detected by one of the elements of the detector 18 to provide a reference signal. Lambda 1 is a wavelength within a spectral band not associated with the fire sensor bands in that the transmission properties of the in-line optical filter are expected to vary with temperature. By example, Lambda 2 may be a wavelength within the lower fire sensor band and Lambda 1 may be a wavelength less than the lower fire sensor lower wavelength cutoff of approximately 0.8 microns. Alternatively, Lambda 2 may be a wavelength within the upper fire sensor band and Lambda 1 may be a wavelength less than the upper fire sensor wavelength lower cutoff of approximately 1.8 microns but greater than the lower fire sensor wavelength upper cutoff of 1.1 microns. The detector is provided with a third sensing element to detect the Lambda 1 wavelength. If Lambda 1 is between the two fire sensor wavelengths the optical filter is constructed to have a transmission characteristic that decreases with temperature for Lambda 1 and is substantially transparent both below and above Lambda 1 at the two fire sensor wavelengths.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF THE INVENTION

Figure 1:
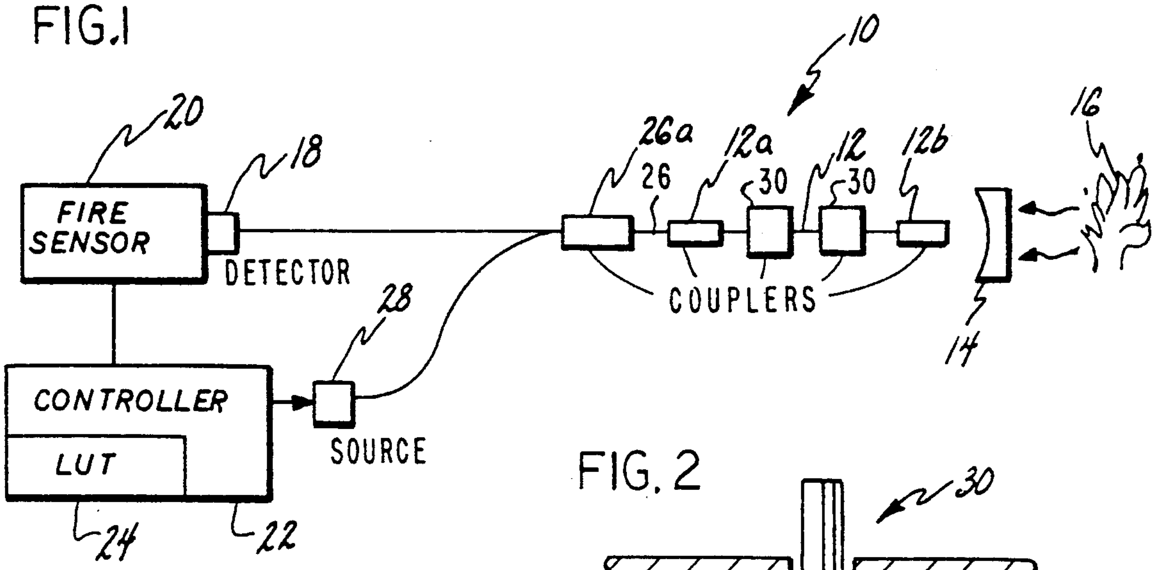
FIG. 1 is a block diagram that illustrates various optical and electrical components that comprise a fire detection and temperature measurement system which is one embodiment of the invention.
Figure 3:
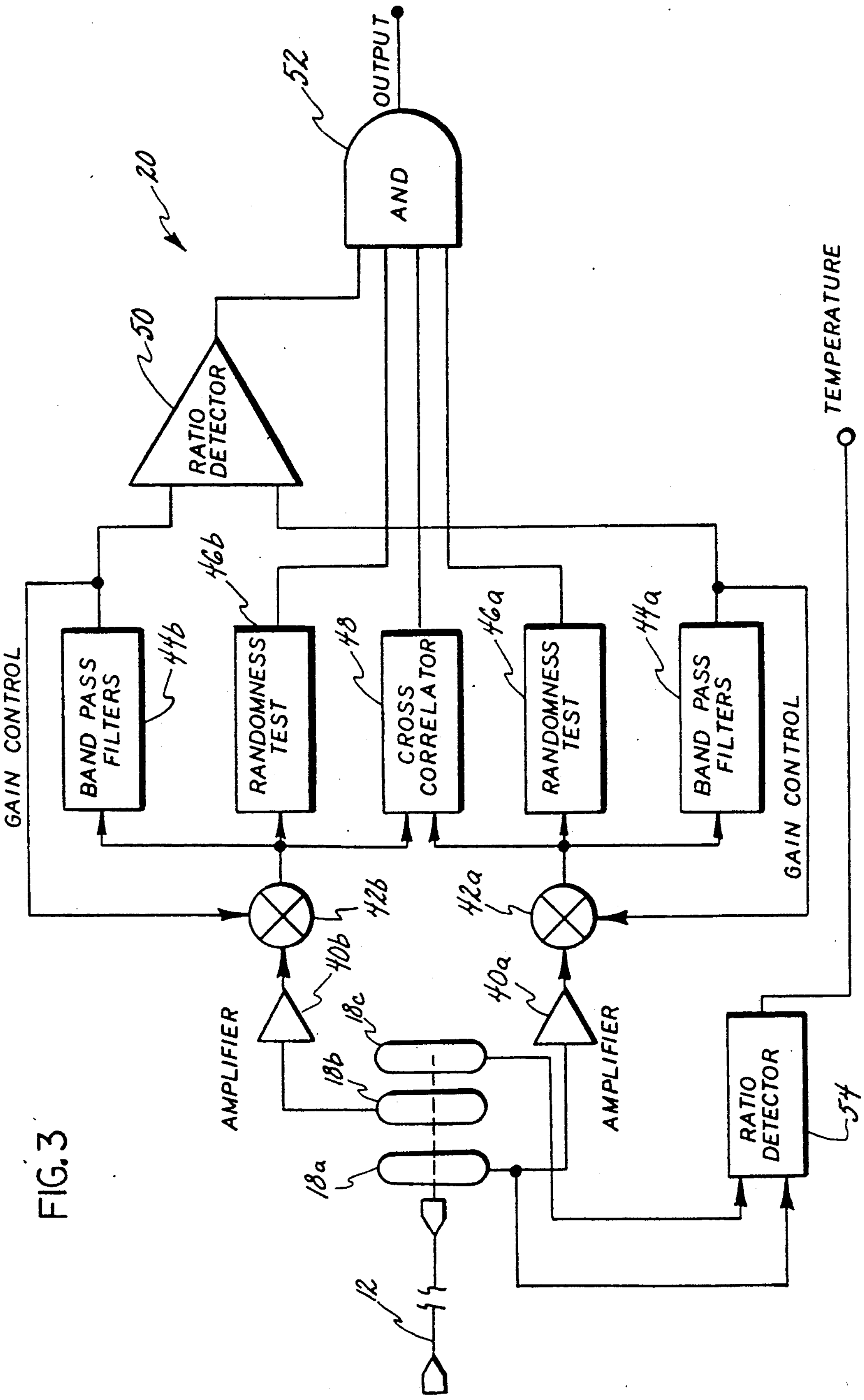
FIG. 3 is a block diagram which shows in greater detail the fire sensor of FIG. 1.

Referring to FIG. 1 and FIG. 3 there is shown a fiber optic fire and overheat sensor system 10. System 10 includes a fiber optic cable 12 having a lens 14 at a distal end to direct radiation from a fire 16 into the cable 12 through an optical coupler **12*a*. The radiation is conveyed to a radiation detector 18 disposed at a proximal end of the cable 12 through an optical fiber 26 and coupler 26*a*. Coupler 26*a* is of minimal length and serves to introduce a controlled source 28 of radiation into the fiber 12. Detector 18 is coupled to a fire sensor 20. The detector 18 is comprised of at least two detector elements (18*a*,18*b*) and is sensitive to at least two spectral bands. In a presently preferred embodiment of the invention the two bands include a short-wavelength band of approximately 0.8 to approximately 1.1 microns and a long-wavelength band of approximately 1.8 to approximately 2.1 microns. A controller 22, such as a microprocessor, analyzes the fire sensor 20 output signals that correspond to the two spectral bands to determine if a fire is present. As can be appreciated the use of a small diameter fiber optic cable with a correspondingly dimensioned pickup 14 lens enables the system 10** to detect fires in small and relatively inaccessible locations.

Figure 2:
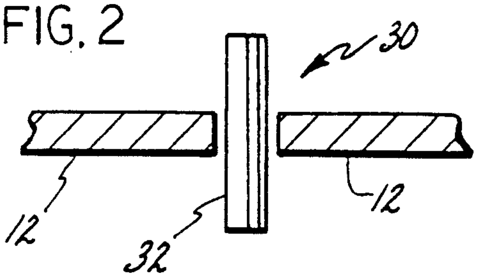
FIG. 2 shows in greater. detail one of the in-line temperature variable optical filters of claim 1.

In accordance with the invention the system 10 is provided with a temperature measurement capability by the inclusion of one or more optical devices selected to have a temperature dependent radiation transmission property. As an example, two in-line optical couplers 30 are placed in series with the fiber 12. As can be seen in FIG. 2 each in-line optical coupler 30 includes an optical filter 32 serially disposed between ends of the fiber 12. The optical filter 32 in one embodiment of the invention is constructed as a multi-layered coating deposited upon a transparent substrate of silica glass, the filter being configured for a temperature dependent transmission at Lambda 1 to exhibit the radiation transmission characteristics illustrated in FIG. 4.

Figure 4:
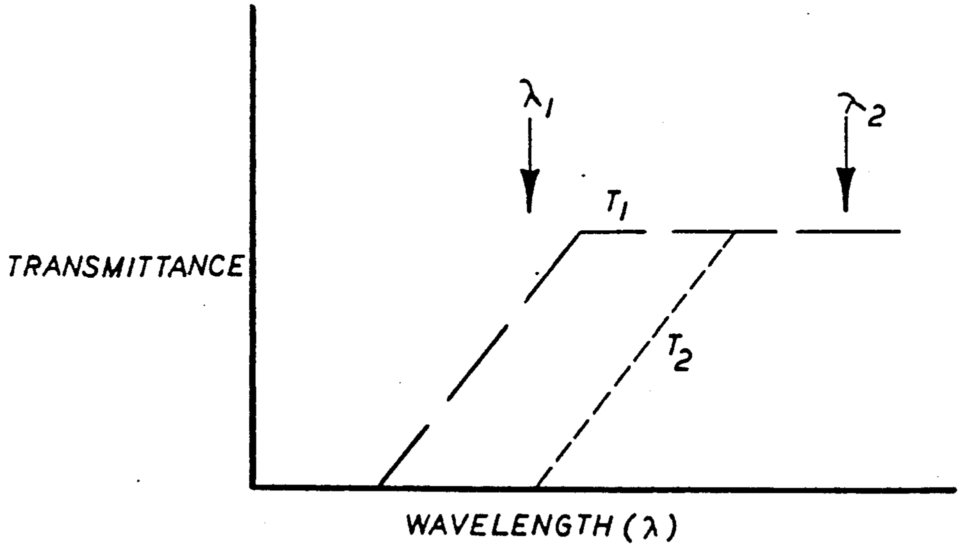
FIGS. 4 and 5 are graphs that illustrate the transmittance versus temperature and wavelength of an in-line optical filter.

One method of implementing the temperature dependent transmission of FIG. 4 is to use the "bandgap" property of various semiconducting materials as part of the coating. Some examples of the cut off wavelength shift due to the bandgap change with temperature are illustrated in the following table.

| Material | Bandgap at 25° C. [ev] | Temperature Coefficient [ev/°C.] | Cutoff Wavelength at 25° C. [microns] | Cutoff Wavelength at 300° C. [microns] |
|---|---|---|---|---|
| GaAs | 1.35 | −0.00050 | .92 | 1.02 |
| CdTe | 1.45 | −0.00041 | .86 | .93 |
| GaP | 2.20 | −0.00054 | .56 | .60 |

As an example, GaP is employed as part of the filter 32. If a yellow LED were used for Lambda 1 and a GaAlAs LED were used for Lambda 2, the ratio of the two LED's, as seen by the detector 18, results in a signal that decreases with temperature as the increasing cutoff wavelength at high temperature blocks more of the Lambda 1 source.

Referring once more to FIG. 1 the foregoing teaching is incorporated within the system 10 by the use of the fiber optic coupler 26 and **26*a* which launches radiation from the source 28, such as a laser diode, into the fiber optic cable 12. The fiber optic cable 12 thus both transmits the source radiation to the distal end and also returns the fire signal from the distal end to the detector 18. In a preferred embodiment of the invention the source 28 comprises a two-wavelength LED operated in either a pulsed or a CW mode. One wavelength (Lambda 2) is within a region where the filter 32 is always substantially transparent regardless of temperature. The other wavelength (Lambda 1) is associated with a spectral band where the filter 32 transmission properties vary with temperature (T1–T2). As a result, a ratio of the Lambda 1 and Lambda 2 signal magnitudes obtained at the detector 18 is indicative of the temperature of the environment along the length of the fiber cable 12**.

By example, Lambda 2 may be a wavelength within the lower spectral band, such as 0.8 microns, so that the source pulse can be detected by one of the elements of detector 18 to provide a reference signal. Lambda 1 is a wavelength within a spectral band not associated with the fire sensor bands in that the transmission properties of the filter 32 are expected to vary with temperature. By example, Lambda 2 may be a wavelength within the lower fire sensor band and Lambda 1 may be a wavelength less than the lower fire sensor lower wavelength cutoff of approximately 0.8 microns. Alternatively, Lambda 2 may be a wavelength within the upper fire sensor band and Lambda 1 may be a wavelength less than the upper fire sensor wavelength lower cutoff of approximately 1.8 microns but greater than the lower fire sensor wavelength upper cutoff of 1.1 microns. In any event, detector 18 is preferably provided with a third sensing element (18*c*) operable for detecting the spectral band associated with the Lambda 1 wavelength. If Lambda 1 is between the two fire sensor wavelengths the optical filter is constructed to have a transmission characteristic that decreases with temperature for Lambda 1 while being substantially transparent both below and above Lambda 1 at the two fire sensor wavelengths.

Figure 5:
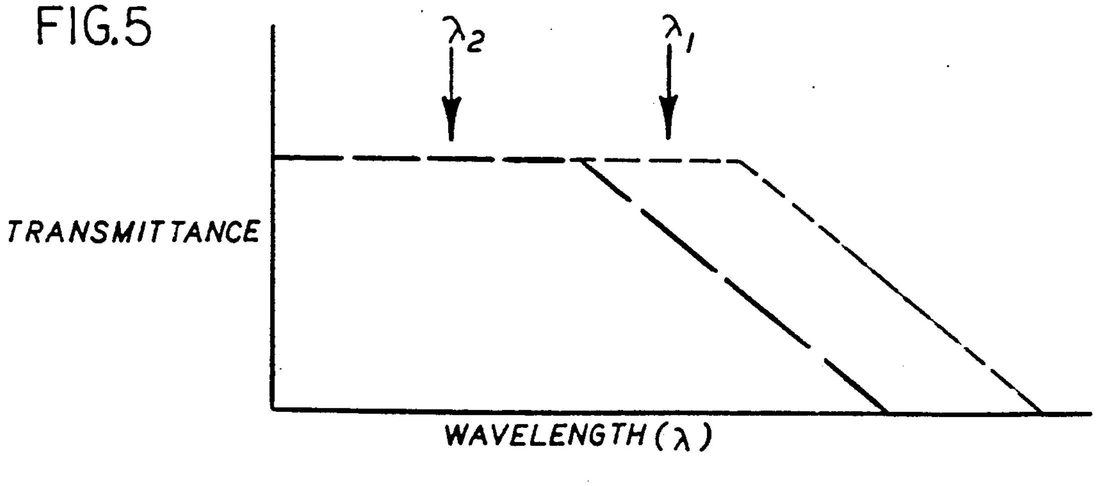

An alternative to the above is shown in FIG. 5, which is the mirror-image of FIG. 4. In FIG. 5, Lambda 2 is the 0.8 to 1.1 micron band and Lambda is a band somewhere between 1.1 and 1.8 microns. Again, this requires the filter 32 to beoome transparent above 1.8 microns in order to transmit fire sensor flicker signals.

In operation source 28 radiation is launched into the fiber 12 and the radiation is reflected from the end of the fiber 12 and is reflected from the in-line couplers 30. This reflected source 28 radiation is detected by detector 18 and the magnitude is measured and analyzed to determine, as a function of absorption, the temperature of the area surrounding in-line couplers 30.

Referring to FIG. 3 there is shown in greater detail the sensor 20 of FIG. 1. The high sensitivity fiber optic fire sensor 20 employs spectral discrimination, flicker frequency discrimination, automatic gain control (AGC), ratio detection, cross correlation and randomness tests to achieve a wide dynamic range of detectable input stimuli without compromising false alarm immunity. It should be realized that the various blocks shown in FIG. 3 may be constructed from discrete circuitry or the functionality of the various blocks may be realized by instructions executed by a microcontroller device such as a digital signal processor (DSP).

Radiation is detected in the two aforementioned infrared spectral bands; namely the long wavelength and the short wavelength spectral bands. The specific bands, approximately 0.8 to approximately 1.1 microns and approximately 1.8 to approximately 2.1 microns, are selected to enhance false alarm immunity. The radiation is collected at the distal end of the fiber optic cable 12 and is conducted thereby to the multi-layer detector 18 that includes fire sensor infrared-sensitive elements (18*a*, 18*b*) and the additional heat sensor element 18*c*. By example, detector 18 may be comprised of a GaAsP-/Si/PbS combination wherein the GaAsP detects wavelengths up to 0.7 microns, as associated with Lambda 1, the PbS detects wavelengths within the range of 1.8 to 2.3 microns and wherein the Si detects the short wavelength radiation 0.8 to 1.1 microns associated with Lambda 2. Each of the detectors 18*a* and 18*b* has an output coupled to a corresponding low noise amplifier 40*a* and 40*b*. The output of each of the amplifiers 40 are applied to an associated variable gain block 42*a* and 42*b* where, in conjunction with a corresponding bandpass filters 44*a* and 44*b*, an AGC function is accomplished. Filters 44*a* and 44*b* are comprised of a multiplicity of bandpass filters such as 1 Hz, 2 Hz and 4 Hz where an output of each bandpass filter is required in order to guarantee that the detected fire has a broad spectral frequency distribution and is not dominated by a single frequency such as a modulated artificial source. The output of each of the variable gain elements 42*a* and 42*b* are input to a corresponding randomness test block 46*a* and 46*b* and to a cross-correlator 48. A ratio detector 50 accomplishes a ratiometric comparison of the outputs of bandpass filters 44*a* and 44*b*. An AND logic function generator 52 receives as inputs the outputs of the ratio detector 50, randomness test blocks 46*a* and 46*b* and the cross-correlator 48. A generator 52 output signal is asserted true, indicating the occurrence of a fire, when each of the inputs are true.

A ratio detector 54 provides an output indicative of temperature, the ratio detector 54 being responsive to a Lambda 2 reference signal provided by one of the fire sensor detectors, such as 18*a*, and also to the Lambda 1 signal output of detector 18*c*. The ratio detector output is preferably digitized and thereafter correlated with the actual temperature of the coupler 30 and, hence, the environment surrounding the fiber 12, by a direct calculation or by a look-up table (LUT) 24 maintained by controller 22. By the use of the LUT 24 system calibration information can also be employed to compensate the temperature measurement for non-linearities in the fiber 12 absorption characteristics, etc.

It has been determined that most false alarm sources have a spectral frequency distribution significantly different from that of flames when observed in two separated wavelength regions. The modulation component of the signals from the two wavelength regions is filtered by filters 44*a* and 44*b* into selected frequencies within the flicker frequency spectrum. This filtering provides additional discrimination against false alarms, most of which have intensity fluctuation spectra different from those of the flames of interest. To preserve this discrimination while allowing a wide range of intensity levels, the flicker modulation spectral information is detected by a ratiometric method (detector 50) which is independent of the absolute value of the spectral information. Additional variation in signal levels is made possible by the variable gain stages 42*a* and 42*b* which precede signal processing.

The flame flicker statistics, such as amplitude and spectral distributions, can be shown to be highly variable in that the spectrum as observed over any time interval of several seconds may be quite different from the spectrum taken over a subsequent time interval. However, and as is shown in U.S. Pat. No. 4,665,390, assigned to the assignee of the patent application, when the fire is modeled as a random process and a randomness test such as Chi Square or Kurtosis is applied, flame flicker is easily separated from non-flame modulated sources. In some cases a relatively simple amplitude modulation test is sufficient to approximate these randomness tests.

A further processing step is used in comparing the shapes of the unfiltered long and short wavelength signals with the cross-correlation block 48. To eliminate false alarms due to chopped, periodic, signals the randomness test blocks 46*a* and 46*b* are also employed within each of the short and long wavelength signal channels.

It should be noted that the embodiment disclosed thus far may employ silica based fiber or germania based fiber for transmitting the spectral bands of interest. However, in other embodiments using other spectral bands other types of fiber, having different radiation transmission properties, are within the scope of the invention. For example, fluoride glass fiber that transmits in the visible to approximately 5 micron range and chalcogenide glass which transmits within the 2 to 10 micron range may be employed. As such the choice of detector 18 is a function of the particular pass band of the fiber, among other considerations.

While the invention has been particularly shown and described with respect to a preferred embodiment thereof, it will be understood by those skilled in the art that changes in form and details may be made therein without departing from the scope and spirit of the invention. For example, other spectral bands can be employed than those set forth above. Also, signal processing methodologies can be employed other than those specifically shown in FIG. 3. As such, the invention is intended to be limited only as the invention is defined by the claims that follow.

What is claimed is:

1. A fire detection system having a fiber optic conductor for conveying radiation at least from a distal end to a proximal end thereof, said system comprising:

first means, optically coupled to said proximal end of said fiber optic conductor, for detecting within a first and a second spectral band the radiation conveyed from said distal end of said fiber optic conductor;

second means, serially coupled within said fiber optic conductor, for transmitting therethrough substantially unattenuated radiation within at least one of said first or said second spectral bands, said second means further absorbing radiation within a third spectral band, the amount of absorbance being a function fo the temperature of said second means; and third means, optically coupled to said second means through said fiber optic conductor at a location between said proximal end and said second means, for generating radiation within either said first or said second spectral band and also within said third spectral band, wherein said first means further detects radiation within said first and said second spectral bands and also within said third spectral band, and wherein said system further comprises fourth means, coupled to said first means and responsive thereto, for indicating a temperature of said first or second spectral bands in conjunction with an amount of radiation detected within said third spectral band.

2. A system as set forth in claim 1 wherein said first spectral band is approximately 0.8 microns to approximately 1.1 microns and wherein said second spectral band is approximately 1.8 microns to approximately 2.1 microns.

3. A system as set forth in claim 2 wherein said third spectral band is less than approximately 0.8 microns.

4. A system as set forth in claim 2 wherein said third spectral band is less than approximately 1.8 microns but greater than approximately 1.1 microns.

5. A system as set forth in claim 1 wherein said second means includes at least one in-line optical coupler having a coating deposited upon a transparent substrate.

6. A system as set forth in claim 5 wherein said coating is comprised of GaAs, CdTe, GaP or combinations thereof.

7. A fire detection system having a fiber optic conductor for conveying radiation at least from a distal end to a proximal end thereof, said system comprising:

detecting means, optically coupled to said proximal end of said fiber optic conductor, for detecting within a first spectral band and within a second spectral band the radiation conveyed from said distal end of said fiber optic conductor;

radiation absorption means, serially coupled at at least one position along a length of said fiber optic conductor, for absorbing radiation within a third spectral band having a wavelength or wavelengths within neither said first nor said second spectal bands, an amount of absorbed radiation being a function of a temperature of said radiation absorbing means, said radiation absorbing means further transmitting therethrough substantially all radiation within said first and said second spectrla bands regardless of the temperature of said radiation absorbing means; and source means, optically coupled to said fiber optic conductor between said detecting means and said radiation absorption means, for generating radiation having a wavelength or wavelengths substantially within either said first or said second spectral bands and also for generating radiation having a wavelength or wavelengths substantially within said third spectral band, and wherein said detecting means further detects radiation within said third spectral band, and wherein said system further comprises means, coupled to said detecting means and responsive thereto, for indicating a temperature of said radiation absorbing means as a function of an amount of radiation detected within either said first or said second spectral bands in conjunction with an amount of radiation detected within said third spectral band.

8. A system as set forth in claim 7 wherien said detecting means comprises:

first radiation detecting means responsive to radiation within said first spectral band and having an output signal coupled to a first signal channel;

second radiation detecting means responsive to radiation within said second spectral band and having an output signal coupled to a second signal channel;

wherein each of said first and said signal channels comprise in combination means responsive to signals having frequencies associated with flame flicker frequencies including amplifier means, variable gain means, bandpass filter means and randomness testing means;

wherein said detecting means further includes cross correlation means having an input from each of the first and the second signal channels and also ratio detecting means having an input from each of said bandpass filter means; and wherein said detecting means further comprises output means having inputs coupled to said first and said second signal channels, said ratio detector means and said cross correlation means and an output responsive thereto for indicating the occurrence of a flame.

9. A system as set forth in claim 8 wherein said detecting means further comprises:

third radiation detecting means responsive to radiation within said third spectral band and having an output signal coupled to a first input of a difference detection means, said difference detection means further having a second input coupled to an output of either said first or said second radiation detecting means, said difference detecting means having an output for indicating a temperature of said radiation absorbing means as a function of the difference between said first and said second inputs.

10. A system as set forth in claim 9 wherein said difference detection means includes a ratio detector.

11. A system as set forth in claim 7 wherein said first spectral band is approximately 0.8 microns to approximately 1.1 microns and wherein said second spectral band is approximately 1.8 microns to approximately 2.1 microns.

12. A system as set forth in claim 11 wherein said third spectral band is less than approximately 0.8 microns.

13. A system as set forth in claim 11 wherein said third spectral band is less than approximately 1.8 microns but greater than approximately 1.1 microns.

14. A system as set forth in claim 7 wherein said radiation absorbing means is comprised of a layer of GaAs, CdTe or GaP deposited upon a substantially transparent substrate.

15. In a fire detection system having a fiber optic conductor for conveying radiation having wavelengths within a first and a second spectral band from a distal end to a proximal end thereof, the radiation originating from a flame within a region of interest, a method of sensing a temperature along a length of said fiber optic conductor, comprising the steps of:

activating a source of optical radiation having a first output within either the first or the second spectral bands and a second output within a third spectral band;

conveying the source radiation through the fiber optic conductor to at least one in-line optical filter means coupled along a length of the fiber optic conductor;

absorbing a portion of the generated radiation within the third spectral band as a function of temperature of the in-line optical filter means while transmitting through the in-line optical filter means substantially all of the generated radiation of the first output regardless of the temperature of the in-line optical filter means;

sampling at the proximal end reflected radiation from the first and the second source outputs to determine a difference in magnitude thereof; and correlating the determined magnitude with the temperature of the in-line optical coupler means.

16. A method as set forth in claim 15 wherein the first spectral band is approximately 0.8 microns to approximately 1.1 microns and wherein the second spectral band is approximately 1.8 microns to approximately 2.1 microns.

17. A method as set forth in claim 16 wherein the third spectral band is less than approximately 0.8 microns.

18. A method as set forth in claim 16 wherein said third spectral band is less than approximately 1.8 microns but greater than approximately 1.1 microns.

19. A method as set forth in claim 15 wherein the step of correlating is accomplished with a table look-up means.

20. A method as set forth in claim 15 wherein the step of absorbing is accomplished by absorbing the portion of the generated radiation within a layer comprised of GaAs, CdTe, GaP or combinations thereof.

* * * * *